(12) United States Patent
Podrouschek et al.

(10) Patent No.: US 9,817,783 B2
(45) Date of Patent: Nov. 14, 2017

(54) MODULE FOR A DATA BUS

(71) Applicant: Beckhoff Automation GmbH, Verl (DE)

(72) Inventors: Martin Podrouschek, Halle (DE); Josef Papenfort, Hüllhorst (DE); Dirk Janssen, Verl (DE); Michael Jost, Dörentrup (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 153 days.

(21) Appl. No.: 14/877,564

(22) Filed: Oct. 7, 2015

(65) Prior Publication Data
US 2016/0026594 A1 Jan. 28, 2016

Related U.S. Application Data

(63) Continuation of application No. PCT/EP2014/056111, filed on Mar. 27, 2014.

(30) Foreign Application Priority Data

Apr. 8, 2013 (DE) .................. 10 2013 206 147

(51) Int. Cl.
*G06F 21/00* (2013.01)
*G06F 13/40* (2006.01)
(Continued)

(52) U.S. Cl.
CPC ..... *G06F 13/4068* (2013.01); *G05B 19/0428* (2013.01); *G06F 13/107* (2013.01); *G06F 21/87* (2013.01); *H04L 9/3234* (2013.01)

(58) Field of Classification Search
CPC ..................................................... H04L 9/3234
See application file for complete search history.

(56) References Cited

U.S. PATENT DOCUMENTS 5,025,420 A * 6/1991 Kimura ............... G06F 11/2221
365/189.14
2003/0005063 A1* 1/2003 Masao .................. H04L 51/066
709/206

(Continued)

FOREIGN PATENT DOCUMENTS

CN 101281573 A 10/2008
CN 102160354 A 8/2011
(Continued)

OTHER PUBLICATIONS

International Preliminary Report on Patentability for International Patent Application No. PCT/EP2014/056111, dated Jun. 18, 2015 (6 pages).

(Continued)

*Primary Examiner* — Morshed Mehedi
(74) *Attorney, Agent, or Firm* — Dorsey & Whitney LLP (57) ABSTRACT

A module for a data bus comprises a terminal. The terminal comprises two opposite outer faces, each comprising at least one contact, wherein the two contacts are connected by means of an internal data-bus line for forwarding data through the terminal via said internal data bus. The module further comprises a software-protection unit which is integrated into the terminal and connected to said data-bus line.

11 Claims, 5 Drawing Sheets

(51) Int. Cl.
    *G05B 19/042*     (2006.01)
    *G06F 21/87*     (2013.01)
    *G06F 13/10*     (2006.01)
    *H04L 9/32*     (2006.01)

(56) References Cited

U.S. PATENT DOCUMENTS

| | | | | |
|---|---|---|---|---|
| 2008/0069075 | A1* | 3/2008 | Holl | H04W 52/146 370/342 |
| 2008/0200200 | A1* | 8/2008 | Usuda | H04W 52/325 455/522 |
| 2011/0153040 | A1* | 6/2011 | Wittmer | G05B 19/4185 700/79 |

FOREIGN PATENT DOCUMENTS

| | | |
|---|---|---|
| DE | 19650989 A1 | 6/1998 |
| DE | 10105363 A1 | 8/2002 |
| DE | 20312437 U1 | 11/2003 |
| DE | 4402002 B4 | 10/2005 |
| DE | 102004049771 A1 | 4/2006 |
| DE | 102005002472 A1 | 7/2006 |
| DE | 102008058033 A1 | 5/2010 |
| DE | 102009038760 B3 | 1/2011 |
| DE | 202010016362 U1 | 3/2011 |
| EP | 1093039 B1 | 11/2003 |
| EP | 2211244 A2 | 7/2010 |
| WO | 0173171 A1 | 10/2001 |
| WO | 2011120881 A1 | 10/2011 |
| WO | 2013004483 A1 | 1/2013 |

OTHER PUBLICATIONS

International Search Report for International Patent Application No. PCT/EP2014/056111, dated Jun. 13, 2014 (3 pages).

English Translation of Chinese Office Action for related Chinese Patent Application No. 201480025548.X, dated Mar. 20, 2017 (4 pages).

\* cited by examiner

Fig. 6

MODULE FOR A DATA BUS

CROSS-REFERENCE TO RELATED APPLICATIONS

This application is a continuation of International Patent Application No. PCT/EP2014/056111, filed on Mar. 27, 2014, entitled MODULE FOR A DATA BUS and published as International Patent Publication No. WO/2014/166744, which claims priority to German Patent Application DE102013206147.1, filed Apr. 8, 2013, entitled MODUL FÜR EINEN DATENBUS, each of which are incorporated by reference herein, in their entirety and for all purposes.

FIELD

The present invention relates to a module for a data bus. The present invention further relates to a module system for a data bus. The present invention further relates to an automation system.

BACKGROUND

The European patent EP 1 093 039 B1 discloses a programmable field meter. A software-protection device is externally plugged to the field meter, the software-protection device allowing for an authorization check by means of a control unit of the field meter.

A particular disadvantage in this context is that additional space is required for the software-protection device. Moreover, the disclosed software-protection device is clearly visible from outside and may e.g. be stolen. In particular, an imitator will be able to recognize immediately that a software-protection device is provided.

A further disadvantage may particularly be that the disclosed software-protection device may be damaged during assembly or repair of the field meter as the disclosed software-protection device sticks out from the field meter.

SUMMARY

The object underlying the present invention may be to provide an improved module for a data bus.

The object underlying the present invention may also be to provide an improved module system for a data bus.

According to an aspect of the present invention, a module for a data bus comprises a terminal. The terminal comprises two opposite outer faces, each comprising at least one contact, wherein the two contacts are connected by means of an internal data-bus line for forwarding data through the terminal via said internal data bus. The module further comprises a software-protection unit which is integrated into the terminal and connected to said data-bus line.

According to a further aspect of the present invention, a module system for a data bus, comprising a dongle module, the dongle module having a terminal, the terminal comprising two opposite outer faces each comprising at least one contact, wherein the two contacts are connected by means of an internal data-bus line for forwarding data through the terminal via said internal data bus line, and a software-protection unit which is integrated into the terminal and connected to said data-bus line. The module system further comprises at least one input/output module for the data bus, the I/O module comprising a further terminal comprising two opposite outer faces each comprising at least one contact, wherein the contacts are connected by means of an further internal data-bus line for forwarding data through the further terminal via the further internal data bus line, wherein the further terminal furthermore comprises a connecting unit for connecting a bus subscriber and a control for controlling the bus subscriber, said control being connected to the data-bus line. The dongle module and the I/O module are arranged side-by-side so that the respective outer faces of the modules are arranged opposite in such a way that the respective contacts of the opposite outer faces contact each other for forwarding data through the terminals via the respective internal data bus line.

According to a further aspect of the present invention a module system for a data bus comprises at least a dongle module and at least an input/output module, wherein the dongle module and the I/O module each comprise a terminal which comprises two opposite outer faces, which each comprise at least one contact, wherein the contacts are connected by means of an internal data-bus line for forwarding data through the terminal via said data bus. The dongle module comprises a software-protection unit that is integrated into the terminal and connected to said data-bus line, said software-protection unit forming a bus subscriber and being configured to be accessed and/or programmed as a bus subscriber via the data bus by means of data-bus protocols. The I/O module further comprises a connecting unit for connecting a bus subscriber and a control for controlling the bus subscriber, said control being connected to the data-bus line. The dongle module and the I/O module are arranged side-by-side, so that the respective outer faces of the modules are arranged opposite in such a way that the respective contacts of the opposite outer faces contact each other for forwarding data through the terminals via the data bus.

The invention is explained in more detail below using figures, in which, in a schematic illustration in each case.

BRIEF DESCRIPTION OF THE DRAWINGS

DETAILED DESCRIPTION

A module for a data bus is provided comprising a software-protection unit with improved protection against theft and outside influences.

According to an aspect, a module for a data bus is provided, the module comprising the following features: a terminal, wherein the terminal comprises two opposite outer faces each comprising at least one contact, wherein the contacts are connected by means of an internal data-bus line for forwarding data through the terminal via the data bus, and a software-protection unit integrated into the terminal and connected to the data-bus line.

According to another aspect, a module system for a data bus is provided, wherein the module system comprises at least one module for a data bus and at least one input/output module for the data bus, the I/O module comprising a further terminal comprising two opposite outer faces each comprising at least one contact, wherein the contacts are connected by means of an internal data-bus line for forwarding data through the further terminal via the data bus, wherein the further terminal moreover comprises a connecting unit for connecting a bus subscriber and a control for controlling the bus subscriber, said control being connected to the data-bus line, the modules being arranged side-by-side so that respective outer faces of the modules are arranged opposite in such a way that the respective contacts of the opposite outer faces contact one another for forwarding data through the terminals via the data bus.

According to yet another aspect, an automation system is provided wherein the automation system comprises a module system for a data bus, wherein a bus coupler unit for connecting the module system to a data bus and a control computer for controlling bus subscribers connectable to the data bus are formed, wherein the software-protection unit is configured for an authorization check by means of the control computer.

The idea is not to plug the software-protection unit to the terminal or to a control from outside, as is known from the prior art. Rather, the software-protection unit is integrated into the terminal which may particularly be configured as an input/output terminal, i.e. a terminal comprising a connecting unit for connecting a bus subscriber and a control for controlling the bus subscriber connected to the data-bus line. Due to said integration, the software-protection unit advantageously does not require any additional installation space. Thus, compared to the prior art, installation space may advantageously be saved.

A software-protection unit particularly refers to a unit which safeguards that software cannot be run or can only be run to a limited extent without the software-protection unit. The software-protection unit is particularly configured for an authorization check by means of the control computer.

As the software-protection unit preferably comprises an electronic component or several electronic components, i.e. at least one electronic component, the software-protection unit may also be referred to as electronic software-protection unit.

Furthermore, due to being integrated into the terminal, the software-protection unit is advantageously no longer directly or immediately accessible so that a theft of the software-protection unit may advantageously be hampered or prevented. In addition, discovery of the software-protection unit may advantageously be rendered more difficult.

Moreover, due to the integration, the software-protection unit is advantageously protected against outside influences which may e.g. lead to damage, particularly if the module has to be exchanged or repaired. As a result, a user can no longer e.g. bump against or get caught at the software-protection unit. This may, however, happen in the prior art since there the software-protection unit usually sticks out from the device.

Furthermore, the software-protection unit is no longer immediately visible from outside due to the integration so that the provision of a software-protection unit in the module may advantageously be concealed.

Due to the fact that compared to the prior art an outside plug connection becomes obsolete, the software-protection unit is advantageously protected e.g. against vibration and shock. This is particularly advantageous if the module is used in a rough environment such as an industrial environment.

Due to the fact that the software-protection unit is connected to the internal data-bus line, the software-protection unit functions like a bus subscriber of the data bus. This particularly means that the software-protection unit forms a bus subscriber due to said connection with the data-bus line. This advantageously allows for accessing and/or programming the software-protection unit via data-bus protocols. Thus, it is not necessary to use complicated programming language, e.g. a high-level language, in order to access and/or program the software-protection unit.

The term "internal" refers to the terminal so that an internal data-bus line, an internal current line and/or an internal voltage connection are integrated between contacts in the terminal.

The I/O module is referred to as an input/output module because at least one bus subscriber able to accept an input and/or issue an output may be connected to the further terminal of the I/O module by means of the connecting unit. The further terminal may also be referred to as I/O terminal. Constructive features and embodiments described in context with the terminal may particularly apply to the I/O terminal.

In a further embodiment, the terminal, i.e. particularly the further terminal, may be formed as a terminal which may engage on a carrier rail.

The wording of a terminal being provided which may engage on a carrier rail particularly means that the terminal is formed to engage on the carrier rail. The carrier rail itself is not necessarily part of the module.

However, it may be provided in an embodiment that the carrier rail is a part of the module.

In another embodiment, it may be provided that the modules, particularly the modules of the module system, engage on a carrier rail.

Due to the fact that the module comprises two opposite outer faces each comprising at least one contact, the two contacts being connected by means of a data-bus line, data may advantageously be forwarded through the terminal via the data-bus, particularly across a plurality of terminals, i.e. particularly across the terminal and the I/O terminal if they are arranged side-by-side in the module system and the individual contacts touch.

The provision that both contacts are connected by means of a data-bus line particularly comprises the case that the two contacts are directly connected by means of the data-bus line. This means that a direct connection is particularly formed between the two contacts via the data-bus line. In this case, the data bus is simply looped through the terminal.

The provision that both contacts are connected by means of a data-bus line particularly comprises the case that the two contacts are indirectly connected by means of the data-bus line. This particularly means that the data-bus line extends from the one contact to a further element, e.g. an electronic component, particularly to the software-protection unit, preferably to the control for the bus subscriber. From said further element, the data-bus line then continues to the other contact. Thus, an indirect connection is particularly formed between the two contacts via the data-bus line. A plurality of elements may e.g. be connected between the two contacts via the data-bus line, particularly in a series connection and/or a parallel connection.

In the case of the direct as well as in the case of the indirect connection, data may be forwarded via the data bus by means of the terminal.

According to an embodiment, a plurality of I/O modules may be provided which particularly have the same or preferably a differing configuration.

According to another embodiment, a plurality of modules each comprising a software-protection unit may be provided, which particularly have the same or preferably a differing configuration.

This particularly means that in a module system and/or in an automation system a plurality of modules and/or I/O modules may be provided which may particularly have the same or preferably a differing configuration.

Embodiments concerning the module analogously apply to the I/O module and vice versa.

The module comprising the software-protection unit may particularly be referred to as a dongle module or a module having a dongle, since in the prior art the term "dongle" is typically used for software-protection units. As a result, the software-protection unit may also be referred to as a dongle. Due to the software-protection unit being integrated in the terminal, the term "dongle terminal" or licence terminal may particularly be used for the module since the software-protection unit typically provides a valid licence for operating the software.

According to an embodiment, the outer faces of the terminal, i.e. particularly the I/O terminal, may comprise a plurality of contacts. This plurality of contacts may e.g. be connected by means of a further internal data-bus line. Particularly, the plurality of contacts may preferably be connected internally by means of an internal current line and/or an internal voltage connection. By providing internal current lines and/or internal voltage connections, the individual bus subscribers connectable to the terminal may be supplied with current and/or voltage in an advantageous manner. In such a case, it is particularly no longer absolutely necessary that the individual bus subscribers comprise their own current supply. The internal voltage connection or internal current connections, respectively, thus provide an internal voltage supply or an internal current supply, respectively.

According to a further embodiment, the terminal may comprise a connecting unit for connecting a bus subscriber as well as a control for controlling the bus subscriber, said control being connected to the data-bus line.

This particularly means that a bus subscriber may be connected to the terminal of the module in analogy to the further terminal of the I/O module, particularly in addition to the software-protection unit. The software-protection unit and the bus subscriber may thus advantageously be connected to the data bus by means of a dongle module. This embodiment referring to a module comprising the connecting unit and the control may thus be referred to as an I/O-dongle module, since in analogy to the I/O module such a module may also be connected to at least one bus subscriber which may accept an input and/or issue an output.

According to an embodiment, the connecting unit may be configured to connect a plurality of bus subscribers.

According to another embodiment, the bus subscriber may be an actuator, a motor or a sensor or any other device.

Provided that a plurality of bus subscribers may be connected, these may particularly have the same or preferably a differing configuration.

According to an embodiment, the connecting unit may comprise one or a plurality of plug contacts and/or one or a plurality of plug terminals and/or one or a plurality of sockets for connecting the bus subscriber(s).

As a corresponding module system or automation system is modularly configured based on the individual modules, i.e. particularly based on the dongle modules and on the I/O modules, the term "module for a modular I/O automation system" may be used as the generic term for the module.

According to a further embodiment, a communication connection may be established between the control and the software-protection unit exclusively by means of the data-bus line.

This particularly means that a communication between the control and the software-protection unit is only possible via the data-bus line. Thus, there is no additional communication connection between the control and the software-protection unit. This particularly and advantageously facilitates the programming of a corresponding communication protocol if data-bus protocols may be used for the communication via the data-bus line. Thus, advantageously, no additional time and effort is required with regard to a programming of a communication between the bus subscriber and the software-protection unit.

According to a further embodiment, a printed circuit board may be integrated in the terminal and the software-protection unit may be arranged on the printed circuit board for electrical contacting.

By providing a printed circuit board, it is advantageously possible to electrically contact the software-protection unit in a particularly simple manner.

In a further embodiment, the printed circuit board may e.g. comprise an interface for the data-bus line. Particularly, the printed circuit board comprises a further interface for a current line and/or a voltage connection. The internal current line, the internal voltage line and the data-bus line may particularly be connected to said interfaces, respectively. For the terms voltage line and current line, the terms voltage connection or current connection, respectively, may particularly be used.

According to another embodiment, the control for controlling the bus subscriber may be arranged on the printed circuit board.

This particularly means that a shared printed circuit board is used in an efficient manner for electrically contacting the software-protection unit and the control. Thereby, an existing available space may advantageously be used in a particularly efficient manner. Preferably, the printed circuit board may be formed such that no direct electrical connection is provided between the software-protection unit and the control. This particularly means that the control and the software-protection unit are electrically insulated from each other on the printed circuit board.

This may be particularly advantageous if e.g. the control has a technical defect such as an electrical short, since in that case such a technical defect may not immediately encroach on the software-protection unit.

According to another embodiment, the control and the software-protection unit may each be arranged on their own printed circuit board. Thus, an electrical or galvanic separation may be carried out in a particularly simple manner so that a defect of one element does not directly affect the other element.

According to another embodiment, the terminal may comprise a terminal housing in which the software-protection unit is integrated. The terminal housing is e.g. formed to engage on a carrier rail. The terminal housing may e.g. have a hollow space in which the software-protection unit is accommodated.

According to yet another embodiment, the terminal may comprise a terminal carrier which may be connected to the terminal housing in a removable manner and engaged on the carrier rail.

This particularly means that the terminal comprises at least two elements: the terminal housing and the terminal carrier. Both are connected to each other in a removable manner. This particularly means that only the terminal housing has to be replaced if the software-protection unit has to be exchanged, the terminal carrier remaining locked on the carrier rail. As a result, considerable mounting and service time may be saved.

Furthermore, this advantageously allows for providing a terminal carrier for a plurality of terminal housings. A flexibility with regard to a design of the module system and/or the automation system is thus advantageously considerably increased.

According to another embodiment, the software-protection unit may be cast for protection against manipulation, e.g. by means of a resin, particularly an epoxy resin. This particularly means that the software-protection unit is surrounded or enveloped or encased by a cast.

By casting the software-protection unit, it is advantageously exacerbated or rendered impossible to get to the software-protection unit in order to e.g. disassemble it. Such a disassembly is e.g. typically carried out in order to get to the individual components of the software-protection unit in order to analyse them in more detail. Such an analysis typically serves the purpose of imitating the software-protection unit's function in order to produce an unauthorized copy of the software-protection unit. The cast, however, makes this considerably more difficult or even prevents it since the software-protection unit is usually considerably or completely damaged when trying to remove the cast. Thus, the cast advantageously provides a particularly effective protection against outer influences and/or attempts of manipulation.

According to an embodiment, the software-protection unit may be integrated in the terminal in a removable manner.

This advantageously allows for exchanging a defect software-protection unit or for replacing it with a different version of the software-protection unit in a quick and simple manner. Moreover, this advantageously reduces the time and effort involved in assembly.

All contacts of the outer faces may e.g. be formed directly opposite, i.e. particularly in a symmetric manner with regard to a symmetry axis of the terminal. However, the contacts may particularly be arranged on the outer faces as desired.

According to an embodiment, the software-protection unit may comprise an electronic component. The electronic component may e.g. be configured to carry out an authorization check by means of the control computer. In particular, a plurality of electronic components may be provided which may particularly have the same or preferably a different configuration.

According to an embodiment, the software-protection unit may comprise e.g. a microcontroller and/or another electronic control unit as an electronic component. The microcontroller and/or the other electronic control unit are particularly configured to be protected against reading and/or manipulation.

According to an embodiment, the software-protection unit may comprise a memory as an electronic component, one or more keys being stored in the memory. Said memory may e.g. be protected against manipulation. For example, the memory may be a read-only memory. The keys may e.g. be used for an encrypting process. Such encrypting processes may be based on essentially known public/private-key encryption processes. This particularly means that a public key and a private key may be stored in the memory.

According to an embodiment, the software-protection unit may be configured to identify itself upon a software request. Only if this identification is positive will the software function fully. Otherwise, it may e.g. be provided that the software only functions in a limited manner or not at all. The requesting software may e.g. run on an industrial PC or on a so-called embedded control in a control box. The feature that the software only runs properly and as intended if the software-protection unit has identified itself positively is usually referred to as dongling.

By combining the integration of the software-protection unit in the terminal and providing a data-bus line for the software-protection unit, a dongling of software may advantageously be achieved in a simple manner by connecting the module with the data bus at any desired location of the data bus. Thus, a spatial separation between the industrial PC or the embedded control on which the software to be dongled runs and the dongle, i.e. the software-protection unit, may advantageously be achieved. The module may thus e.g. be unobtrusively accommodated in a control box in an advantageous manner, whereas the industrial PC or the embedded control may be provided with a spatial separation to said control box. An identification between the software and the software-protection unit is then advantageously carried out via the data bus.

According to an embodiment, the data bus may be a field bus. However, the present invention is not necessarily limited to the field bus. Any desired other data busses may be provided such as EtherCAT, Ethernet Powerlink, CAN, Profibus, Profinet, M-Bus, T-Bus, VARAN, FlexRay, Fieldbus Foundation, SMI, EtherNet/IP, LCN, INTERBUS, LON, KNX-Standard, LIN-Bus or ARCNET.

According to an embodiment, the software-protection unit may comprise a microcontroller for controlling the data transmission via the data bus and/or for processing input and/or output data.

According to another embodiment, the microcontroller may be controlled by means of a software which is stored in a memory, preferably in an OTP (one time programmable) memory. Such a memory may particularly be written to only once and is particularly a non-volatile memory.

According to an embodiment, the microcontroller may be configured for encrypting output data, in particular release data, and/or for decrypting encrypted input data. Such release data may e.g. comprise the information to what extent and/or by whom the software to be dongled may be used.

According to an embodiment, a bus coupler may be provided which is configured to couple a data bus to the module or module system.

According to an embodiment, the module system comprises a plurality of modules, each comprising a software-protection unit. The plurality of modules may e.g. have the same or a differing configuration.

According to an embodiment, the module system comprises a plurality of I/O modules which may e.g. have the same or a differing configuration.

According to an embodiment, the module system exclusively comprises a plurality of dongle modules which may particularly have the same or e.g. a differing configuration. Such a module system particularly does not comprise I/O modules. In this embodiment, as well, the plurality of dongle modules may preferably be arranged and/or formed analogously to the module system comprising dongle modules as well as I/O modules.

In the following, the same reference numerals may be used for the same features. It is possible that for a clearer overview not all reference numerals and/or all individual features have in every case been depicted.

Figure 1:
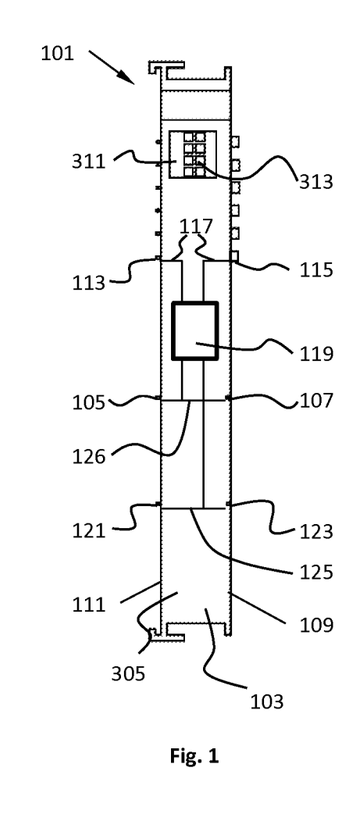
FIG. 1 depicts a module for a data bus.

FIG. 1 shows a module 101 for a data bus.

The module 101 comprises a terminal 103 configured to engage on a carrier rail. For this purpose, the terminal 103 may e.g. comprise lugs which are e.g. arranged on a bottom face of the terminal 103.

The terminal 103 comprises two opposite outer faces 109 and 111 which each comprise at least one contact 113, 115.

This particularly means that at least one contact 113, 115 is formed at each of the outer faces 109 and 111.

The two contacts 113 and 115 are connected by means of an internal data-bus line 117. Thereby, data may advantageously be forwarded via the data bus by means of the terminal 103.

Moreover, a software-protection unit 119 is provided which is integrated into the terminal 103 and connected to the data-bus line 117. Here, the data-bus line 117 extends from contact 113 to the software-protection unit 119 and from there to contact 115.

By connecting the software-protection unit to the data-bus line 117, the software-protection unit 119 is turned into a bus subscriber for the data bus. This particularly means that the software-protection unit 119 may be accessed and/or programmed via the data bus as a bus subscriber, e.g. by means of bus protocols. This particularly means that the software-protection unit 119 acts as a bus subscriber.

Moreover, further contacts 105, 107, 121 and 123 are formed at the outer faces 109 and 111 of the terminal 103. The two further contacts 121 and 123 are connected by means of an internal voltage connection 125, whereas the two further contacts 105 and 107 are connected by means of an internal voltage connection 126. The software-protection unit 119 is connected to said voltage connections 125 and 126 in order to realize a voltage supply of the software-protection unit 119. Due to the connection of the further contacts 105 and 107 as well as 121 and 123 by means of the voltage connections 126 and 125, the voltage supply may additionally be looped through the terminal 103.

In an embodiment, the connection of the voltage connections 125 and 126 with the software-protection unit 119 may be dispensed with. It may then e.g. be provided that the software-protection unit 119 does not require a voltage supply or has its own voltage supply.

Furthermore, further contacts may be configured at the two outer faces 109, 111 of the terminal 103 so that several current lines and/or several bus lines may be formed.

Furthermore, the terminal 103 comprises a display unit 311 comprising a plurality of LEDs (light-emitting diodes) 313 which are arranged at a terminal housing 305 of the terminal 103. Thereby, e.g. an operating status of the software-protection unit 119 may be displayed. It is to be noted that the number of LEDs 313 is not to be considered limiting. In particular, other illuminants may be provided instead of or in addition to the LEDs 313.

Figure 2:
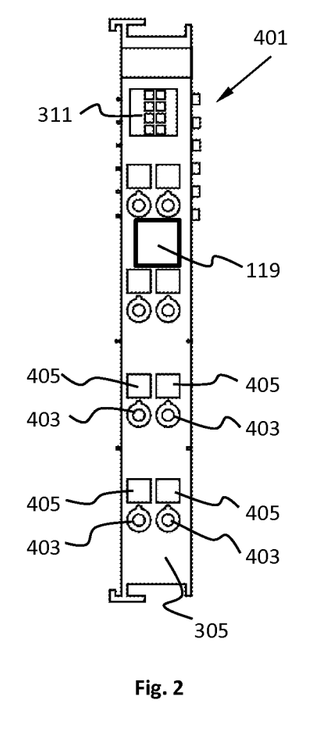
FIG. 2 shows a further module for a data bus.

FIG. 2 shows another module 401 for a data bus.

The module 401 is essentially formed analogously to the module 103 of FIG. 1, wherein the internal lines 117, 125 and 126 are not depicted herein for a better overview. As a connecting unit for connecting bus subscribers, the module 401 additionally comprises a plurality of connecting openings 403 for connecting further bus subscribers. Such bus subscribers may e.g. be actuators, sensors and/or motors. In this context, said connecting openings 403 are arranged as pairs on top of each other along a longitudinal face of the terminal housing 305.

For a better overview, a control or several controls for controlling the bus subscribers have not been depicted.

Over the respective pair of connecting openings 403, a pair of openings 405 is respectively provided for inserting a tool such as a screwdriver in order to e.g. disengage or fasten the lines connected to the bus subscribers in an advantageous manner. Here, the lines connected to the bus subscribers in the connecting openings 403 may be electrically and/or mechanically contacted by means of screws, bolts and/or spring contacts and/or by means of other contacting means known from the prior art. Thus, the connecting openings 403 may also be referred to as terminal point.

As the module 401 may take over a dongle function as well as an input/output function, the module 401 may also be referred to as I/O dongle module.

An I/O module without dongle function but only with an I/O function may be formed analogously to the module 401, except for the difference that the I/O module does not comprise a software-protection unit 119.

Figure 3:
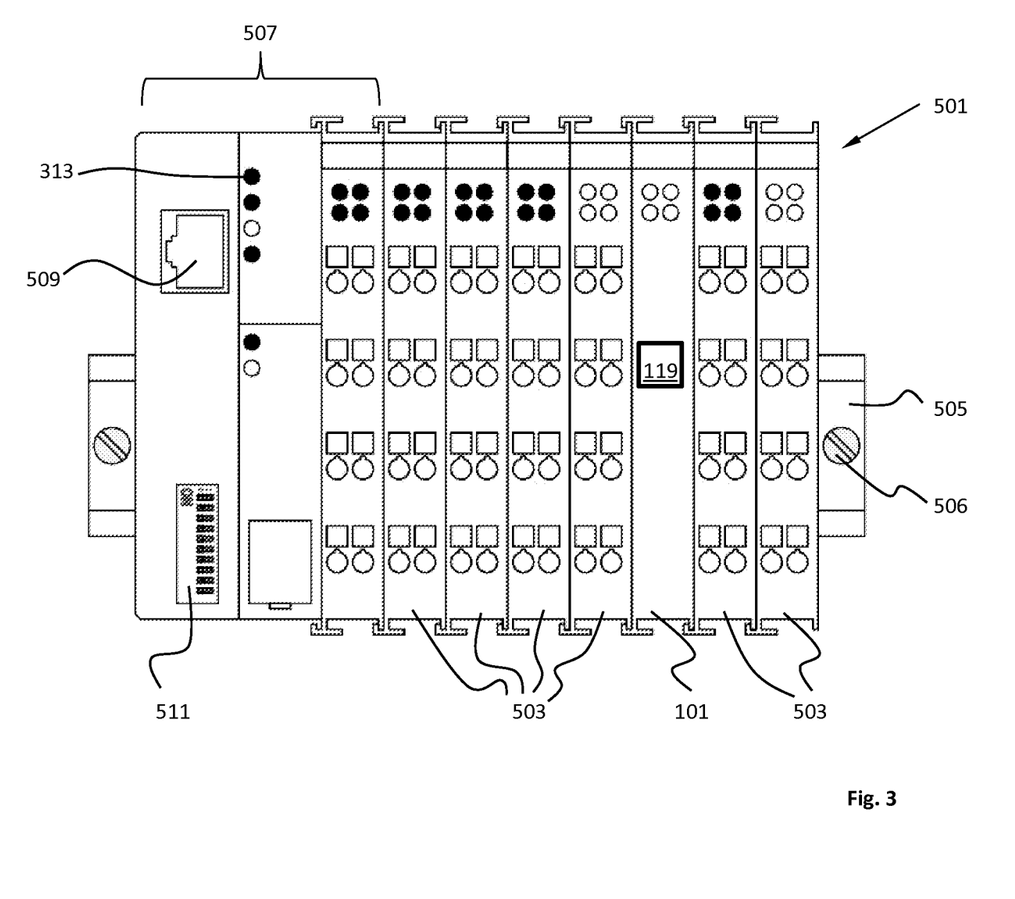
FIG. 3 shows a module system for a data bus.

FIG. 3 shows a module system 501 for a data bus.

In this context, a plurality of input/output modules 503 are provided without software-protection units.

Furthermore, the module system 501 comprises a dongle module 101 which is configured analogously to the module 101 of FIG. 1. Thus, the module 101 does not comprise a connecting unit for connecting a bus subscriber.

The individual modules 101 and 503 are arranged adjacent to each other and engage with or on a carrier rail 505. The carrier rail 505 may be mounted in a control box e.g. by means of two screws 506.

The individual contacts 113, 115, 105, 107, 121, 123 shown in FIG. 1 and described above, as well as the further contacts of the individual modules depicted without reference numerals contact one another so that data may be forwarded through the terminals via the data bus and a current or voltage supply may be provided in the terminals for connected bus subscribers. This is not shown for a better overview.

Furthermore, the module system 501 comprises a bus coupler 507 which may e.g. comprise a plugging location 509 for a bus cable. The plugging location 509 may e.g. be configured as an RJ 45 socket. Thereby, an RJ 45 plug may advantageously be inserted into the plugging location 509.

Furthermore, the bus coupler 507 comprises a plurality of dual inline package switches 511 in order to e.g. provide an address of the bus coupler 507.

Furthermore, the bus coupler 507 comprises a plurality of LEDs 313 in order to e.g. display an operating status of the bus coupler 507. Instead of or in addition to LEDs, other illuminants may be provided.

The number of modules shown in FIG. 3 are not to be considered limiting. In particular, more or less modules 503 may be provided. For example, more than one module 101 comprising a dongle function may be provided. Instead of or in addition to the module 101, a module analogous to the module 401 of FIG. 2 may be provided. Altogether, e.g. up to 225 modules 101, 503 may be provided.

Figure 4:
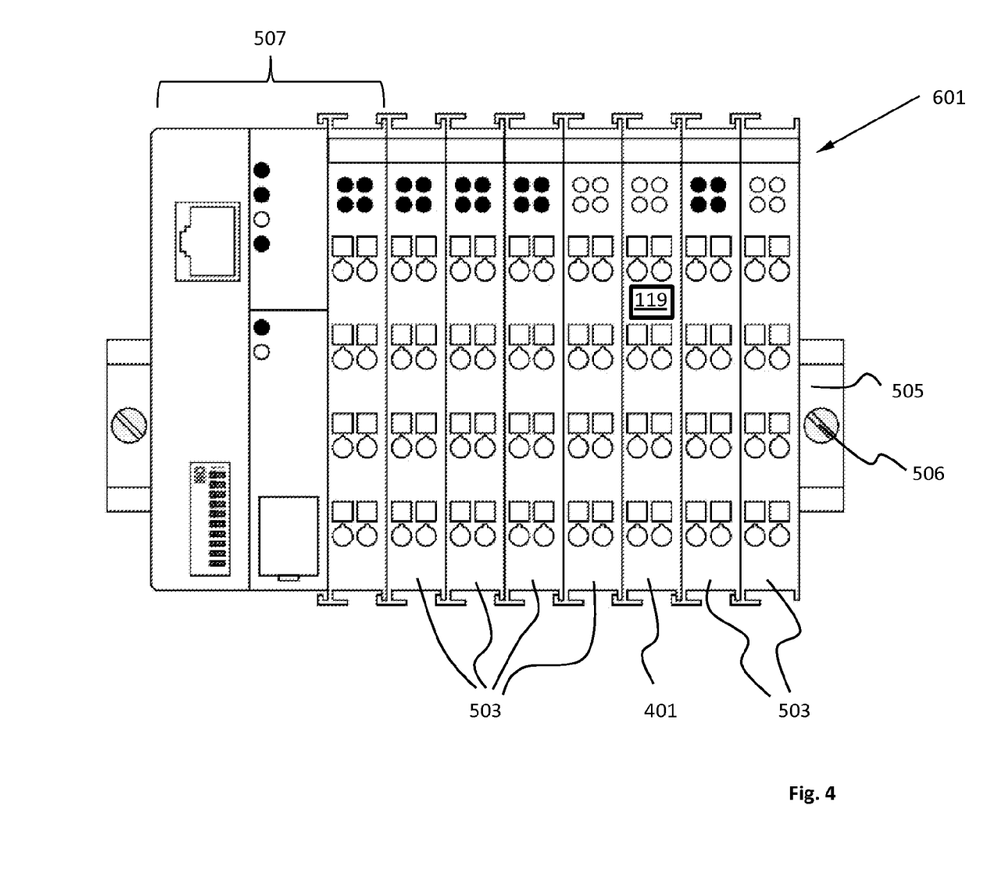
FIG. 4 depicts a different module system for a data bus.

FIG. 4 shows a further module system 601 for a data bus.

The module system 601 is configured analogously to the module system 501 of FIG. 3. Reference is made to the corresponding description. The difference consists in that instead of the module 101, a module 401 according to FIG. 2 is provided.

Here, as well, the depicted number of modules 401, 503 is not to be considered limiting. In not-depicted embodiments, more or less modules 503 than those shown herein may be provided. For example, a plurality of modules 401 may be provided. For example, instead of or in addition to the module 401 or the modules 401, another module 101 or a plurality of modules 101 according to FIG. 1 may be provided.

Figure 5:
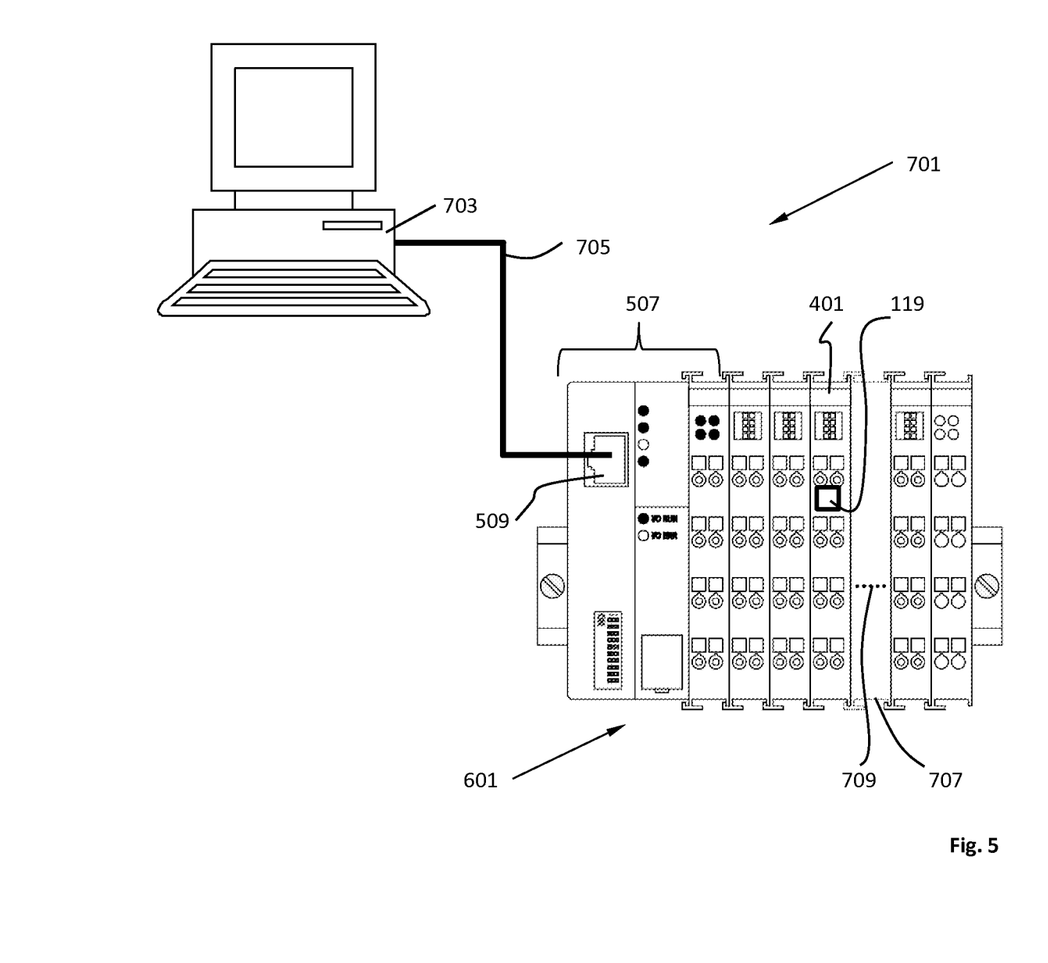
FIG. 5 shows an automation system.

FIG. 5 shows an automation system 701.

The automation system 701 comprises the module system 601 of FIG. 4, wherein one of the modules is depicted with a dashed line. Said module depicted with a dashed line is indicated with reference numeral 707. Moreover, several points 709 are plotted in the module 707, which is to symbolize that yet further modules may be provided in addition to the depicted modules. Said further modules may be formed analogously to the modules 503. For example, one or several of the further modules may also be a module 101, 401 of FIG. 1 or of FIG. 2.

The automation system 701 comprises a control computer 703 which is connected to the bus coupler 507 via a data bus 705. Here, the data bus 705 is plugged into the socket 509. By means of this, the control computer 703 may communicate with the individual modules 503, 401. Particularly, this advantageously allows for an authorization check of the software-protection unit 119 of the module 401 by means of the control computer 703.

In general, the control computer 703 may communicate with the software-protection unit(s) of the individual dongle modules via the data bus and e.g. activate corresponding software which is e.g. run on the controls of the I/O modules, with or without dongle function. The software may e.g. also be run on other control computers.

By providing the dongle module, a spatial separation may advantageously be achieved between the computer on which the software to be dongled runs and the software-protection unit, i.e. the dongle.

Figure 6:
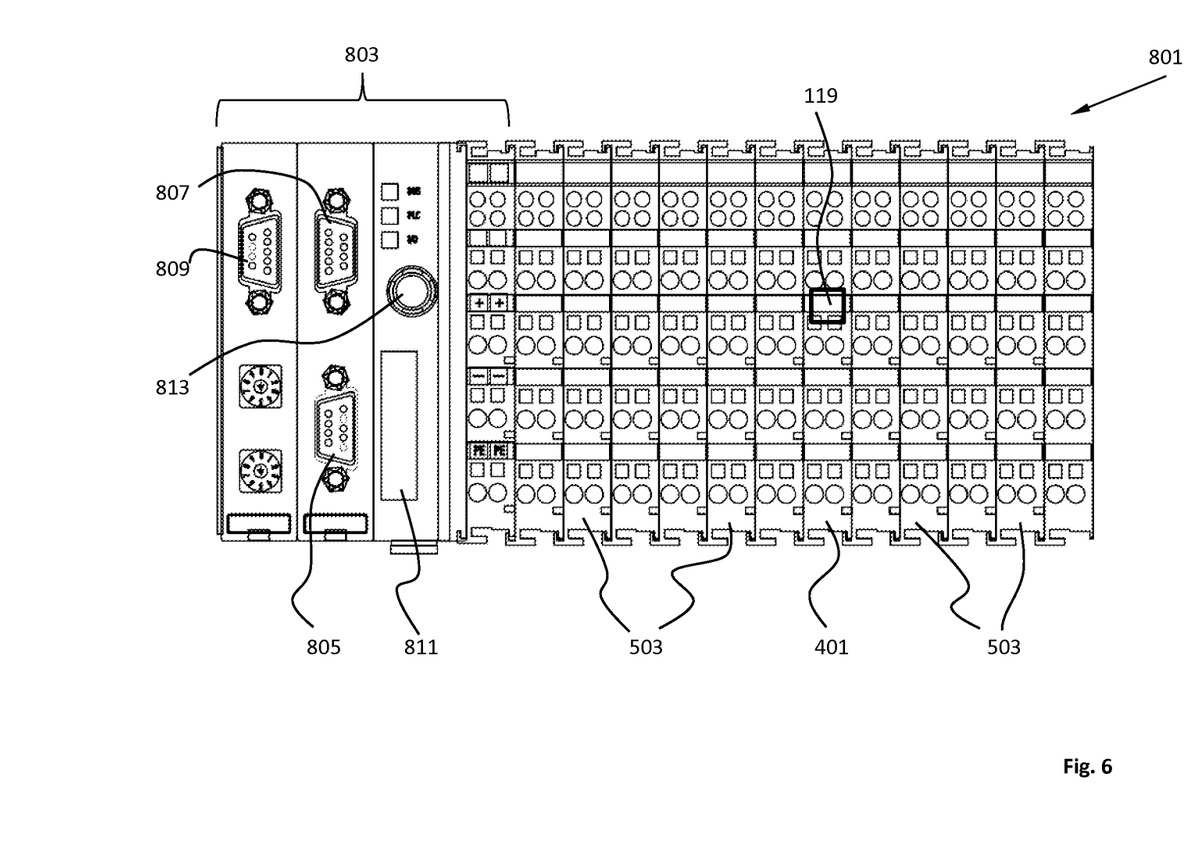
FIG. 6 depicts a further module system for a data bus.

FIG. 6 shows a further module system 801 for a data bus.

The module system 801 is configured analogously to the module systems 501 and 601 of FIGS. 3 and 4. However, the bus coupler is embodied as a bus-terminal controller or as a bus-terminal control 803 which may take over a bus-coupling function as well as the function of a control computer.

The bus-terminal control 803 comprises a plurality of serial interfaces 805, 807 and 809. One of the serial interfaces 805, 807, 809 may be provided for programming modules 503 and 401. The two other serial interfaces may be used for any other applications and thus are free to be used as is seen fit.

Furthermore, the bus-terminal control 803 comprises a display 811, e.g. an illuminated LCD display, e.g. an illuminated 2-by-16-lines LCD display in order to thereby particularly and advantageously display parameters relating to an operating state of the module system.

Moreover, the bus-terminal control 803 comprises a joystick switch 813 in order to be able to e.g. perform inputs for the individual modules 503, 401 in an advantageous manner in order to e.g. set the addresses of the individual modules 503, 401. Instead of or in addition to the module 401, at least one module 101 according to FIG. 1 may be provided.

In summary, the present invention is thus particularly based on the idea of integrating a software-protection unit into a terminal wherein said terminal may be a part of a modular input/output automation system comprising a data bus, wherein the software-protection unit is connected to the data bus as a bus subscriber.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A module system for a data bus, comprising
a dongle module, the dongle module having a terminal, the terminal comprising two opposite outer faces, each comprising at least one contact,
wherein the two contacts are connected by an internal data-bus line for forwarding data through the terminal via said internal data-bus line, and
a software-protection unit integrated into the terminal and connected to said internal data-bus line; and
at least one input/output (I/O) module for the data bus, the I/O module comprising a further terminal comprising two opposite outer faces each comprising at least one contact, wherein the contacts are connected by a further internal data-bus line for forwarding data through the further terminal via the further internal data: bus line, wherein the further terminal furthermore comprises a connecting unit for connecting a bus subscriber and a control for controlling the bus subscriber, said control being connected to said internal data-bus line,
wherein the dongle module and the I/O module are arranged side-by-side so that the respective outer faces of the modules are arranged opposite in such a way that the respective contacts of the opposite outer faces contact each other for forwarding data through the terminals via the respective internal data: bus line.

2. The module system of claim 1, further comprising a bus-coupling unit for connecting the module system to a bus and a control computer for controlling bus subscribers is formed, wherein the software-protection unit is configured for an authorization check by the control computer.

3. A module system for a data bus, comprising at least a dongle module and at least an input/output (I/O) module,
wherein the dongle module and the I/O module each comprise a terminal which comprises two opposite outer faces, which each comprise at least one contact, wherein the contacts are connected by an internal data-bus line for forwarding data through the terminal via said data bus,
wherein the dongle module comprises a software-protection unit that is integrated into the terminal and connected to said internal data-bus line, said software-protection unit forming a bus subscriber and being configured to be accessed and/or programmed as a bus subscriber via the data bus by data-bus protocols,
wherein the I/O module further comprises a connecting unit for connecting a bus subscriber and a control for controlling the bus subscriber, said control being connected to the internal data-bus line, and
wherein the dongle module and the I/O module are arranged side-by-side, so that the respective outer faces of the modules are arranged opposite in such a way that the respective contacts of the opposite outer faces contact each other for forwarding data through the terminals via the data bus.

4. The module system of claim 3, wherein the terminal of the dongle module comprises at least one connecting unit for connecting a bus subscriber and a control for controlling the bus subscriber connected to the internal data-bus line.

5. The module system of claim 3, wherein in the dongle module a communication connection between the control and the software-protection unit is exclusively formed by the internal data-bus line.

6. The module system of claim 3, wherein a printed circuit board is integrated into the terminal of the dongle module and the software-protection unit is arranged for electrically contacting the printed circuit board.

7. The module system of claim 3, wherein the terminal of the dongle module comprises a terminal housing accommodating the software-protection unit.

8. The module system of claim 3, wherein the software-protection unit is cast for protection against manipulation.

9. The module system of claim 3, wherein the outer faces of the terminal of the dongle module each comprise further contacts, which are each connected to one another by internal voltage connections for providing an internal voltage supply.

10. The module system of claim 3, wherein a bus coupler for connecting the module system to the data bus is provided.

11. The module system of claim 3, wherein the modules engage with or on a carrier rail.

* * * * *

UNITED STATES PATENT AND TRADEMARK OFFICE
CERTIFICATE OF CORRECTION

PATENT NO. : 9,817,783 B2
APPLICATION NO. : 14/877564
DATED : November 14, 2017
INVENTOR(S) : Martin Podrouschek et al.

Page 1 of 1

It is certified that error appears in the above-identified patent and that said Letters Patent is hereby corrected as shown below:

In the Claims

At Column 12, Line 11, Claim 1, Line 15:
"internal data: bus line,"
Should read:
--internal data-bus line,--

At Column 12, Line 21, Claim 1, Line 25:
"internal data: bus line."
Should read:
--internal data-bus line.--

Signed and Sealed this
Seventeenth Day of April, 2018

Andrei Iancu
*Director of the United States Patent and Trademark Office*